(12) United States Patent
Uhl et al.

(10) Patent No.: US 6,622,387 B2
(45) Date of Patent: Sep. 23, 2003

(54) TANK FOR AN OPERATING SUBSTANCE AND ESPECIALLY A TANK FOR AN OPERATING SUBSTANCE FOR A PORTABLE HANDHELD WORK APPARATUS

(75) Inventors: Klaus-Martin Uhl, Baltmannsweiler (DE); Florian Hoche, Stuttgart (DE)

(73) Assignee: Andreas Stihl AG & Co., Waiblingen (DE)

( * ) Notice: Subject to any disclaimer, the term of this patent is extended or adjusted under 35 U.S.C. 154(b) by 0 days.

(21) Appl. No.: 09/916,289

(22) Filed: Jul. 30, 2001

(65) Prior Publication Data

US 2002/0017023 A1 Feb. 14, 2002

(30) Foreign Application Priority Data

Aug. 4, 2000 (DE) .......................... 100 38 141

(51) Int. Cl.[7] .......................... B23D 59/04; B23D 57/02; A01G 3/025
(52) U.S. Cl. .......................... 30/123.4; 30/383; 137/587; 220/231
(58) Field of Search ................................ 30/123.4, 383; 220/231; 137/587

(56) References Cited

U.S. PATENT DOCUMENTS

| 5,896,669 | A | | 4/1999 | Uhl |
| 6,123,216 | A | * | 9/2000 | Yokocho et al. ............. 220/564 |
| 6,161,510 | A | * | 12/2000 | Ishikawa et al. ....... 123/73 AD |

* cited by examiner

Primary Examiner—Douglas D. Watts
(74) Attorney, Agent, or Firm—Walter Ottesen

(57) ABSTRACT

The invention relates to an operating substance tank (1) which is especially for a portable handheld work apparatus (2). The tank (1) has a fill opening (3) and a suction connection (4). The tank is configured from a first housing part (6) and a second housing part (7) connected to the first housing part (6). In this way, the tank is built up in a simple manner and is operationally reliable. A valve (8) is formed in the interior of the tank (1) so that a valve member (9) is held by the first housing part (6) and the valve member (9) comes into seal-tight contact on an opening (10) of a through bore (11) on the second housing part (7). The valve (8) functions especially as an aerating valve for the tank (1).

17 Claims, 5 Drawing Sheets

TANK FOR AN OPERATING SUBSTANCE AND ESPECIALLY A TANK FOR AN OPERATING SUBSTANCE FOR A PORTABLE HANDHELD WORK APPARATUS

BACKGROUND OF THE INVENTION

U.S. Pat. No. 5,896,669 discloses a tank for an operating substance for a portable handheld work apparatus, namely, for an overhead branch cutter. The tank is configured as one part and has a fill opening for filling with lubricating oil as well as a suction connection for supplying the lubricating oil to a saw chain running on a guide bar.

The tank containing the operating substance is fixed on an attachment flange for the guide bar. During operation, external mechanical forces operate on the tank. Furthermore, an underpressure can occur for an operating substance tank as the tank empties and this underpressure hinders the dispensing of the lubricating oil.

SUMMARY OF THE INVENTION

It is an object of the invention to improve an operating substance tank in such a manner that an increased buildup of underpressure in the tank is prevented with a simple configuration.

The tank of the invention for holding an operating substance includes: a tank housing having a tank interior and including a first housing part; and, a second housing part connected to the first housing part and defining the tank interior conjointly therewith; a valve unit disposed in the tank interior and including a valve member and a valve opening; the second housing part defining the valve opening; the first housing part including the valve member arranged therein so as to be in seal-tight contact engagement with the valve opening; and, the tank including a fill opening and a suction connection through which the operating substance is drawn.

A simple mounting of an aerating valve is possible with the formation of the operating substance tank from two housing parts. The valve member is held by the first housing part of the tank housing and this valve element comes to lie seal tight against a valve opening of a through bore on the second housing part when joining the two housing parts of the operating substance tank. Advantageously, the valve member is held on a stub which projects from the first housing part in the direction toward the second housing part. The stub is preferably of a cylindrical shape. The valve member can be configured as a cylindrical stub which, with its flat end face, lies in surface contact on the opening and around the opening of the passthrough bore on the second housing part. The effective sealing surface has the form of an annular disc. An excellent resistance against dirt particles is provided by this large area sealing surface. The valve member can be provided as a sealing cone whereby a linear-shaped to a ring-shaped sealing surface is formed. During operation of a portable handheld work apparatus, the aerating valve functions to compensate the underpressure which develops as the operating substance tank becomes empty. The valve opens to the ambient and thereby permits the pressure equalization.

When the underpressure develops in the tank as the operating substance is drawn therefrom via the suction connection, the ambient atmospheric pressure operates on the valve member made, for example, of an elastomeric sealing mass and causes at least a portion thereof to lift away from the valve opening to allow air to flow into the tank to compensate for the underpressure thereby ensuring that the operating substance continues to flow out through the suction connection.

It is practical to configure the valve member from an elastomeric material, preferably, from a two-component sealing mass which is sprayed onto the first housing part and sets. The valve member can also be configured as a cylindrically-shaped full rubber part. This full rubber part is connected on its one end to the cylindrically-shaped stub on the first housing part and lies seal tight on the valve opening of a through bore to the atmosphere on the second housing part with a planar sealing surface configured transversely to the longitudinal axis of the valve member.

An intermediate layer of a solid seal, preferably an elastomeric two-component sealing mass, is provided between the tank surfaces of the housing parts for sealingly connecting the two housing parts of the tank housing. Preferably, in advance of connecting the housing parts, a two-component sealing mass is sprayed onto the flange-like partition surfaces of a housing part and, after hardening or setting of the two-component sealing mass, the housing parts are connected to each other via a form-tight, force-tight or material-tight connection.

If the tank for the operating substance is used in a portable handheld work apparatus, then it is practical to configure one housing part of the tank housing of the operating substance tank (preferably the second housing part having the valve opening of the through bore) with the apparatus housing of the portable handheld work apparatus itself. If the work apparatus is an overhead branch cutter and if the operating substance tank functions to store lubricating oil for a saw chain, then it is practical to utilize an attachment flange of the guide bar as the second housing part of the tank housing of the operating substance tank and to arrange the operating substance tank on the side of the attachment flange lying opposite to the work tool, especially the guide bar having the saw chain running along the periphery thereof.

The leakage oil, which runs through the through bore of the valve during operation of the operating substance tank on the overhead branch cutter, can be directed to an intended use. For this purpose, it is practical to so arrange the through bore on the second housing part (that is, on the attachment flange of the overhead branch cutter) that this through bore opens on the side of the attachment flange (the side lying opposite to the tank housing) on the work tool, especially in the slide region of the moving saw chain. To effect a simple and wear-resistant assembly of the operating substance tank, it is practical to make the tank housing of plastic (preferably of fiber-reinforced plastic) with a local wall thickness, which varies over the periphery of the tank housing, in order to configure those wall regions to have greater strength which are especially subjected to mechanical loads.

BRIEF DESCRIPTION OF THE DRAWINGS

The invention will now be described with reference to the drawings wherein.

DESCRIPTION OF THE PREFERRED
EMBODIMENTS OF THE INVENTION

Figure 1:
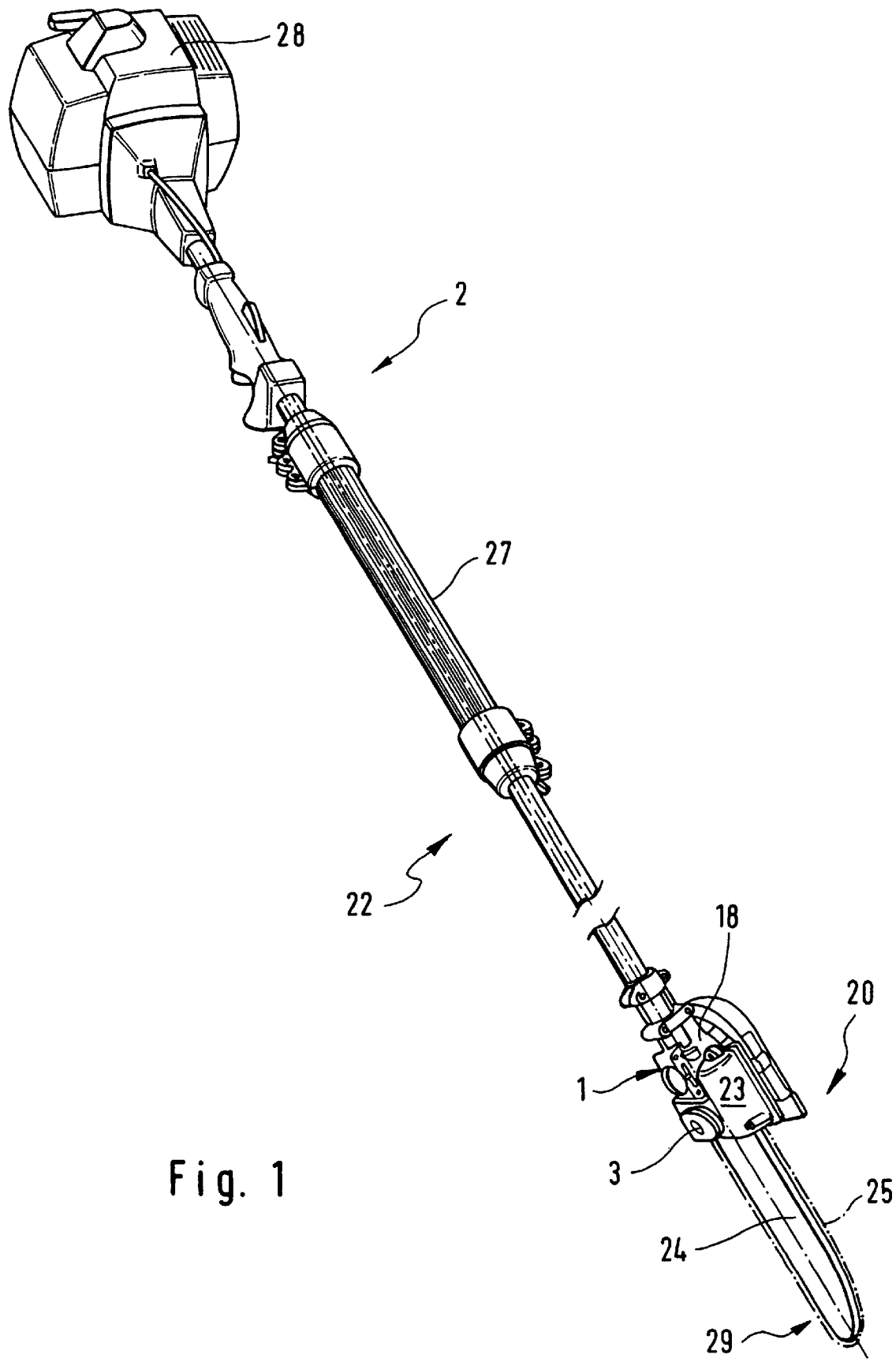
FIG. 1 is a perspective view of a portable handheld work apparatus equipped with an operating substance tank according to the invention.

The portable handheld work apparatus 2 of FIG. 1 functions to cut branches from trees or the like and is herein referred to as an overhead branch cutter 22. The portable handheld work apparatus 2 is driven by a drive motor 28 at the end of a telescopic rod 27. The work tool 20 is configured as a cutterhead 29 and is mounted on an end of the telescopic rod 27 opposite the drive motor 28 and is driven. The work tool 20 comprises essentially a gearcase 18 having a guide bar 24 fixedly mounted thereon. A saw chain 25 runs on the periphery of the guide bar. An operating substance tank 1 has a fill opening 3 and is mounted on the work apparatus 2 and stores, in the embodiment shown, lubricating oil 23 for the saw chain 25.

Figure 2:
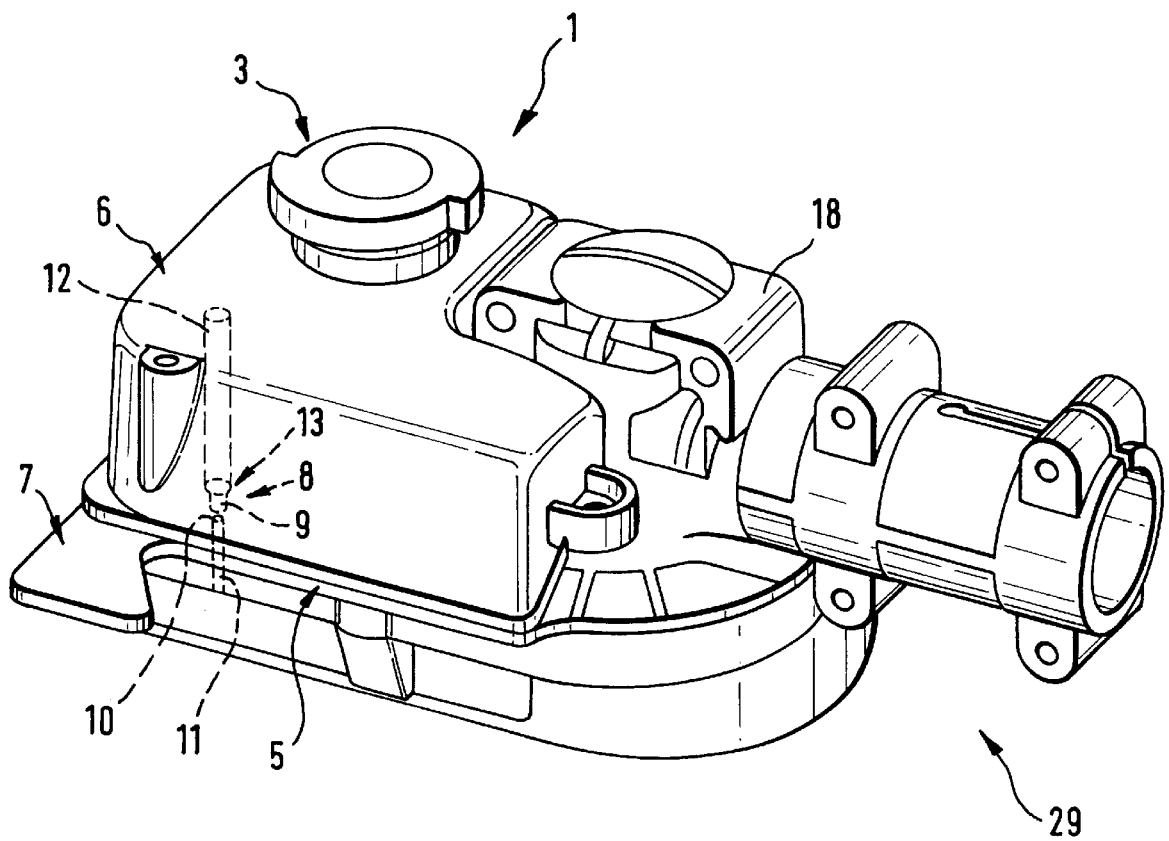
FIG. 2 is a perspective view of the operating substance tank on the housing of the overhead branch cutter of FIG. 1.
Figure 3:
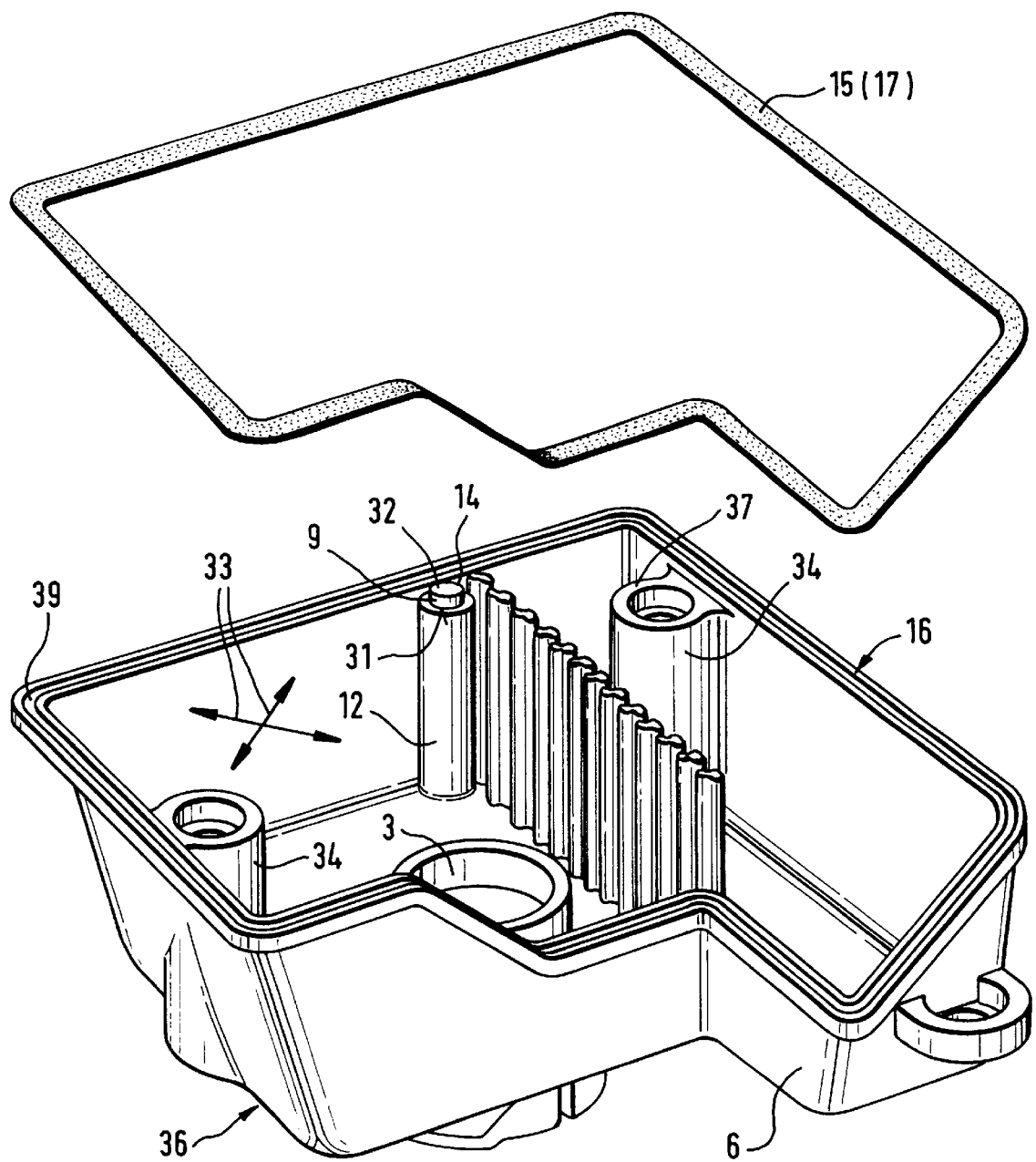
FIG. 3 is a perspective view of a first housing part of the tank housing of the operating substance tank.
Figure 4:
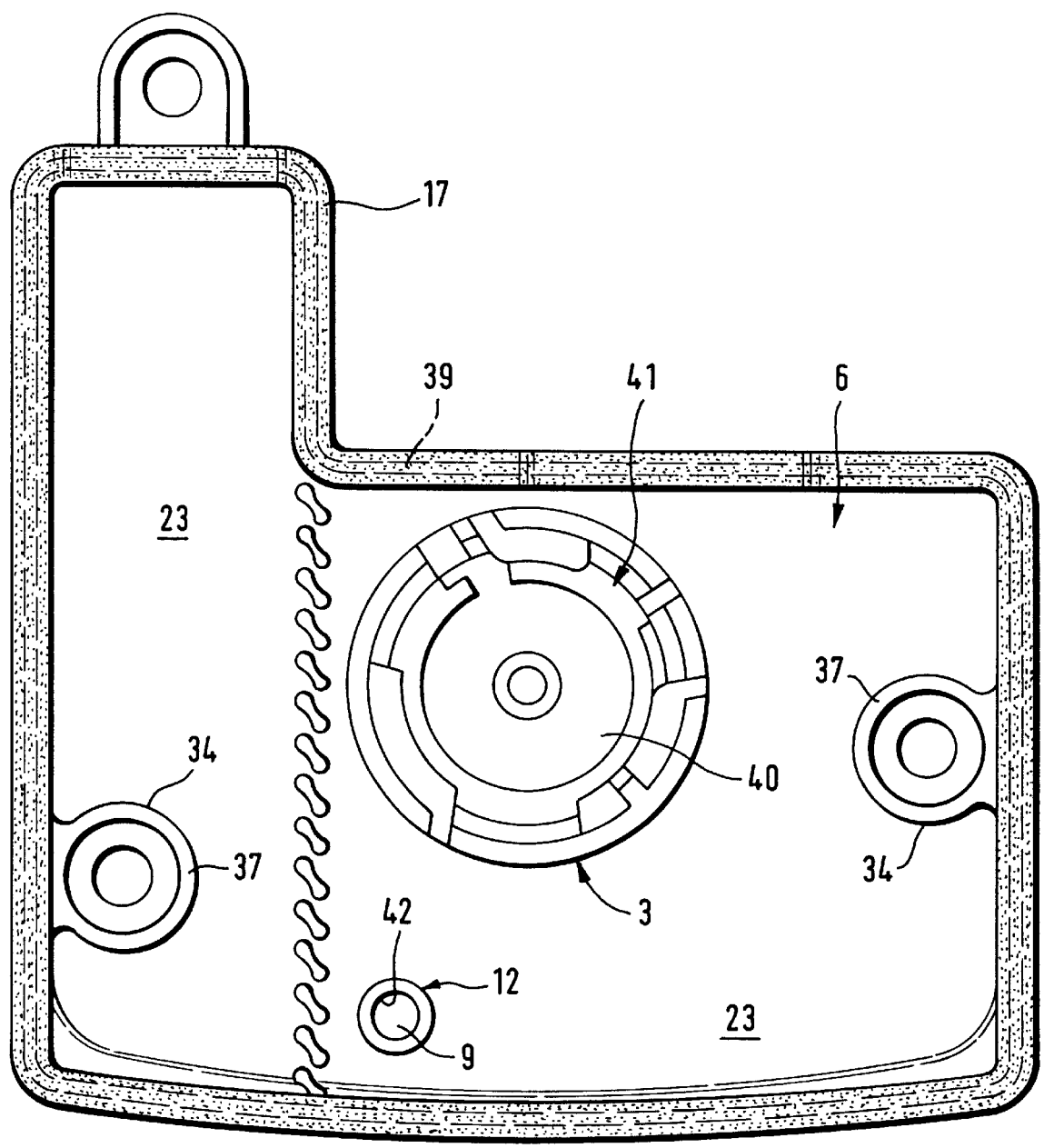
FIG. 4 is a plan view of the first part of the tank shown in FIG. 3.

FIGS. 2, 3 and 4 show the operating substance tank 1 in a preferred configuration on the gearcase 18 of the portable handheld work apparatus shown in FIG. 1. FIG. 2 shows a perspective view of the operating substance tank 1 of the invention on the gearcase 18 and especially on the cutterhead 29 of the portable handheld work apparatus. As shown in FIG. 1, the tank housing 5 is configured of a first housing part 6 and a second housing part 7 connected to the first housing part 6. The two housing parts (6, 7) are connected to each other with threaded fasteners.

Figure 5:
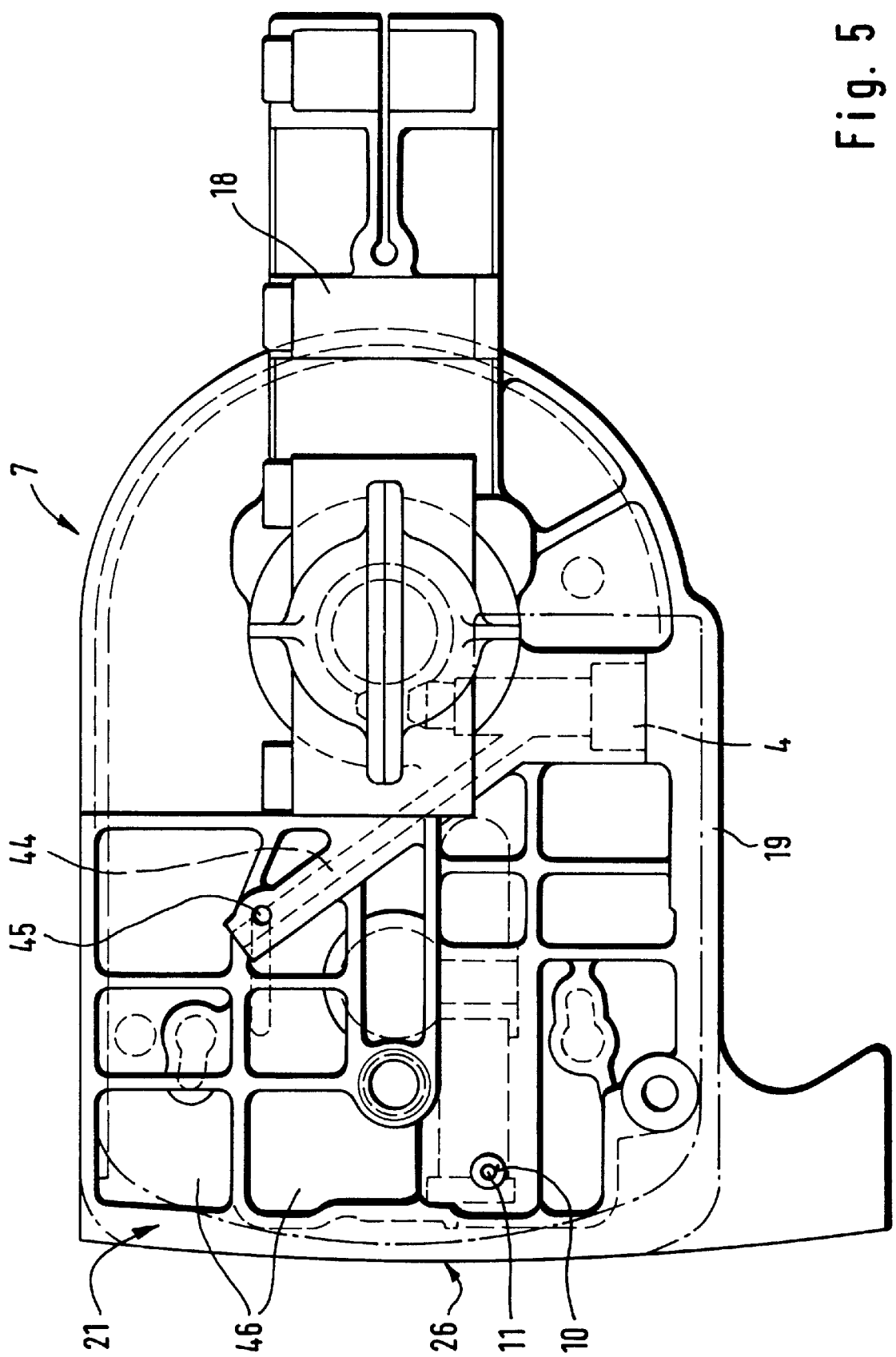
FIG. 5 is a plan view of the second housing part configured as an attachment flange of a work apparatus.

A valve 8 in the interior of the tank 1 is configured in a simple manner so that a valve member 9, which is held by the first housing part 6, comes into sealing contact engagement on a valve opening 10 of a through bore 11 on the second housing part 7. Preferably, to form the valve 8, a cylindrically-shaped stub 12 is configured as one piece with the first housing part and projects from this first housing part into the interior of the tank 1 toward the second housing part 7 as shown in FIG. 3. The stub 12 can be configured as a pipe or as a complete component. FIGS. 2 and 5 show that the valve member 9 comes to rest over a surface area and around the opening 10.

In the embodiment shown, the valve 8 functions as an aerating valve 13 for the tank 1. During operation of the portable handheld work apparatus, the operating substance, such as lubricating oil, is drawn from the tank 1 so that an underpressure can develop in the interior of the tank 1. This underpressure would inhibit the dispensing of the operating substance from the operating substance tank. Ambient air passes by the valve member 9 via the through bore 11 on the second housing part 7 into the interior of the tank as soon as a certain underpressure difference has formed between the ambient pressure of the portable handheld work apparatus and the interior of the operating substance tank. With the above-described constructive measures, a valve is provided in a simple manner when joining the two housing parts (6, 7) of the tank housing 5 which permanently effects an aeration of the operating substance tank.

FIG. 3 is a perspective view of the first housing part 6 and shows the valve member 9 which is preferably in the form of a cylindrical section of an elastomeric material. The valve member 9 is held on the stub 12 at an end 31. The section ends with a planar sealing surface 32 lying opposite the end 31 approximately in a partition plane 33 between the first and second housing parts. It is practical to form the valve member 9 from a two-component sealing mass 14 which is sprayed onto the stub 12 and cured. This constructive measure simplifies the assembly of the operating substance tank according to the invention because, preferably, a solid matter seal 15 is mounted between the housing parts (6, 7) of the tank housing 5 on the partition surfaces 16 of the parts (6, 7) and this solid matter seal can be formed of the same two-component sealing mass 17 sprayed and cured or set on the partition surface 16 on the first housing part 6. The two-component sealing mass 17 is the same from which the valve member 9 is formed.

It can be advantageous to configure the valve member 9 as a valve cone which projects with its conical tip into the opening 10. In this way, a line sealing contact results which can easily become a ring-shaped or annular-shaped sealing contact depending upon the applied force.

The first housing part 6 is shown perspectively in FIG. 3 and is connected to the second housing part 7 in FIG. 2 with threaded fasteners. For this purpose, cylindrically-shaped inward projections 34 are provided on the interior 35 of the housing part 6. These inward projections 34 project from the outer side 36 of the first housing part 6 up to the partition plane 33 in the first embodiment. The projections 34 end with planar sealing surfaces 37 at approximately the elevation of the partition plane 33 and function to accommodate cylindrical threaded fasteners (not shown) or the like for threadably joining the housing parts 6 and 7. By arranging the projections 34 in the interior of the tank housing, few snag surfaces are provided, for example, where tree branches can snag on the exterior of the tank housing and the work with a portable handheld work apparatus having an operating substance tank according to the invention on its outer side is not hindered. A peripherally extending slot 39 is provided in the flange-like partition surfaces 16 on the first housing part 6. The slot 39 functions to fix a solid substance seal or for accommodating the two-component sealing mass 17, which is applied as a liquid, and which sets in advance of assembling the housing parts (6, 7).

FIG. 4 is a plan view of the interior of the first housing part 6 of FIG. 3 and shows that the housing part 6 is configured to have an L-shape with an overall trough-shaped configuration (FIG. 3). The fill opening 3 is closed with a cap 40 having a bayonet closure connection 41. An annularly-shaped receptacle 42 on the cylindrical stub 12 is shown and permits a form-tight and/or material-tight holding of the valve member 9.

As FIGS. 2 and 5 show, the tank housing 5 (preferably the second housing part 7) is formed by an apparatus housing 18, especially by an attachment flange 19 for the work tool of the portable handheld work apparatus.

The attachment flange 19 can be seen in the plan view of the second housing part 7 of FIG. 5. The through bore 11 with the valve opening 10 is introduced into the attachment flange 19. The bore 11 opens onto a side 26 of the attachment flange 19 on which the work tool is attached. The operating substance tank 1 is arranged on the side 21 of the attachment flange 19 which is opposite the side 26. The tank is filled with the lubricating oil 23 via the fill opening 3 (see FIG. 2) and is supplied to the work tool with the aid of a piston pump via a suction connection 4, a pressure channel 44 in the attachment flange and to an outlet opening 45. The suction connection 4 is formed in the attachment flange 19.

To increase the volume of the tank 1, a plurality of indentations 46 is introduced into the attachment flange. The attachment flange itself is preferably configured as a form-stiff component made of aluminum alloy or magnesium alloy. The first housing part 6 preferably comprises a fiber-reinforced plastic and can be configured with a desired wall strength as a mechanical component which can be subjected to high loads. To improve the operational reliability of the operating substance tank according to the invention, it can be practical to configure a grip piece on the cap rotationally symmetrical with respect to the longitudinal axis of the fill opening. The cap is for closing the fill opening. The grip piece is preferably configured to be retractable into a guide in the wall of the first housing part.

It is understood that the foregoing description is that of the preferred embodiments of the invention and that various changes and modifications may be made thereto without departing from the spirit and scope of the invention as defined in the appended claims.

What is claimed is:

1. A tank for holding an operating substance, the tank comprising:

a tank housing having a tank interior and including a first housing part; and, a second housing part connected to said first housing part and defining said tank interior conjointly therewith;

a valve unit disposed in said tank interior and including a valve member and a valve opening;

said second housing part defining said valve opening;

said first housing part including said valve member arranged therein so as to be in seal-tight contact engagement with said valve opening when said first and second housing parts are assembled thereby automatically forming said valve unit; and, said tank including a fill opening and a suction connection through which said operating substance is drawn.

2. A tank for holding an operating substance, the tank comprising:

a tank housing having a tank interior and including a first housing part; and, a second housing part connected to said first housing part and defining said tank interior conjointly therewith;

a valve unit disposed in said tank interior and including a valve member and a valve opening;

said second housing part defining said valve opening;

said first housing part including said valve member arranged therein so as to be in sealtight contact engagement with said valve opening;

said tank including a fill opening and a suction connection through which said operating substance is drawn;

said valve unit further including a cylinder-shaped stub for holding said valve member; and, said cylinder-shaped stub being disposed in said first housing part so as to project in a direction toward said second housing part.

3. The tank of claim 2, said valve member being in line contact engagement or in surface contact engagement with said valve opening.

4. The tank of claim 2, wherein said valve unit is an aerating valve.

5. The tank of claim 1, wherein said valve member is made of an elastomeric bonded two-component sealing mass.

6. A tank for holding an operating substance, the tank comprising:

a tank housing having a tank interior and including a first housing part; and, a second housing part connected to said first housing part and defining said tank interior conjointly therewith;

a valve unit disposed in said tank interior and including a valve member and a valve opening;

said second housing part defining said valve opening;

said first housing part including said valve member arranged therein so as to be in sealtight contact engagement with said valve opening;

said tank including a fill opening and a suction connection through which said operating substance is drawn;

said valve member being made of an elastomeric bonded two-component sealing mass; and, said valve member being sprayed onto said first housing part.

7. A tank for holding an operating substance, the tank comprising:

a tank housing having a tank interior and including a first housing part; and, a second housing part connected to said first housing part and defining said tank interior conjointly therewith;

a valve unit disposed in said tank interior and including a valve member and a valve opening;

said second housing part defining said valve opening;

said first housing part including said valve member arranged therein so as to be in seal-tight contact engagement with said valve opening;

said tank including a fill opening and a suction connection through which said operating substance is drawn;

said first and second housing parts having first and second partition surfaces, respectively, which conjointly define a partition interface; and, said tank further including a solid matter seal arranged at said partition interface; and, said first and second housing parts being connected to each other with said solid matter seal being disposed therebetween.

8. The tank of claim 7, wherein said seal is a bonded two-component sealing mass and is sprayed onto said partition surfaces.

9. The tank of claim 1, wherein said tank is for a portable handheld work apparatus having an apparatus housing defining one of said housing parts.

10. The tank of claim 9, wherein said one housing part is said second housing part.

11. The tank of claim 10, wherein said portable handheld work apparatus includes a work tool and said second housing part defines an attachment flange for said work tool.

12. The tank of claim 11, wherein said tank is mounted on the side of said attachment flange lying opposite said work tool.

13. The tank of claim 8, further comprising a through bore formed on said second housing part and defining said valve opening;

said attachment flange having a side lying opposite said tank housing; and, said through bore opening on said side at said work tool.

14. The tank of claim 1, wherein one of said first and second housing parts is made of plastic.

15. The tank of claim 14, wherein said first housing part is made of plastic.

16. The tank of claim 15, wherein said first housing part is made of fiber reinforced plastic.

17. An overhead branch cutter comprising:

a drive motor assembly;

a gearcase;

a guide bar mounted on said gearcase;

a saw chain movably mounted on said guide bar;

a rod for operatively connecting said gearcase to said drive motor assembly so as to permit said drive motor assembly to move said saw chain around said guide bar;

a tank for holding a lubricant for said saw chain;

said tank including a tank housing mounted on said gearcase;

said tank housing having a tank interior and including a first housing part; and, a second housing part connected to said first housing part and defining said tank interior conjointly therewith;

a valve unit disposed in said tank interior and including a valve member and a valve opening;

said second housing part defining said valve opening;

said first housing part including said valve member arranged therein so as to be in seal-tight contact engagement with said valve opening until there is a predetermined underpressure in said tank; and, said tank including a fill opening and a suction connection through which said lubricant is drawn for lubricating said saw chain thereby generating said underpressure.

* * * * *